US012785168B2

(12) United States Patent
Park

(10) Patent No.: US 12,785,168 B2
(45) Date of Patent: Nov. 3, 2026

(54) BATTERY PACK INCLUDING HEAT TRANSFER MEMBER HAVING COOLING FLUID INTRODUCTION PORTION AND COOLING FLUID DISCHARGE PORTION FORMED THEREIN

(71) Applicant: LG ENERGY SOLUTION, LTD., Seoul (KR)

(72) Inventor: Jin Soo Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 635 days.

(21) Appl. No.: 18/270,470

(22) PCT Filed: Dec. 13, 2022

(86) PCT No.: PCT/KR2022/020269

§ 371 (c)(1),
(2) Date: Jun. 29, 2023

(87) PCT Pub. No.: WO2023/121116

PCT Pub. Date: Jun. 29, 2023

(65) Prior Publication Data

US 2024/0063463 A1 Feb. 22, 2024

(30) Foreign Application Priority Data

Dec. 21, 2021 (KR) ........................ 10-2021-0183490

(51) Int. Cl.

| | |
|---|---|
| ***H01M 10/6552*** | (2014.01) |
| ***H01M 10/48*** | (2006.01) |
| ***H01M 10/613*** | (2014.01) |
| ***H01M 10/63*** | (2014.01) |
| ***H01M 10/6555*** | (2014.01) |
| ***H01M 50/204*** | (2021.01) |

(52) U.S. Cl.

CPC ..... *H01M 10/6552* (2015.04); *H01M 10/486* (2013.01); *H01M 10/613* (2015.04);

(Continued)

(58) Field of Classification Search

CPC .. H01M 10/486; H01M 10/613; H01M 10/63; H01M 10/647; H01M 10/6552;

(Continued)

(56) References Cited

U.S. PATENT DOCUMENTS

2015/0311572 A1 10/2015 Sung et al.
2016/0204488 A1 7/2016 Arai et al.

(Continued)

FOREIGN PATENT DOCUMENTS

CN 104485488 A * 4/2015 .......... H01M 10/052
CN 105452025 A 3/2016

(Continued)

OTHER PUBLICATIONS

Machine translation CN104485448A (Year: 2015).*
Machine translation JP2015106527A (Year: 2015).*
Machine translation KR20100011256U (Year: 2010).*

*Primary Examiner* — Victoria H Lynch

(74) *Attorney, Agent, or Firm* — Bryan Cave Leighton Paisner LLP

(57) ABSTRACT

A battery pack including a battery cell stack of a plurality of battery cells, a cooling member configured to cool the battery cell stack, a heat transfer member configured to discharge heat from the plurality of battery cells to the cooling member, and a housing for battery cell stack, the cooling member, and the heat transfer member. The heat transfer member is provided with a cooling fluid introduction portion and a cooling fluid discharge portion. When the temperature of the battery cell is equal to or lower than a dangerous temperature, it is possible to adjust the temperature of each of the battery cells to a predetermined level, and when the temperature of the battery cell is higher than the dangerous temperature, it is possible to rapidly cool the battery cell.

15 Claims, 5 Drawing Sheets

(52) U.S. Cl.
CPC ....... *H01M 10/63* (2015.04); *H01M 10/6555* (2015.04); *H01M 50/204* (2021.01)

(58) Field of Classification Search
CPC ......... H01M 10/6555; H01M 10/6557; H01M 10/6569; H01M 10/658; H01M 2220/20; H01M 50/204; Y02E 60/10
See application file for complete search history.

(56) References Cited

U.S. PATENT DOCUMENTS

| | | | |
|---|---|---|---|
| 2020/0203785 | A1 | 6/2020 | Deji et al. |
| 2022/0181716 | A1 | 6/2022 | Katayama et al. |

FOREIGN PATENT DOCUMENTS

| | | | |
|---|---|---|---|
| CN | 207149666 | U | 3/2018 |
| CN | 110690531 | A | 1/2020 |
| CN | 111347933 | A | 6/2020 |
| CN | 211150726 | U | 7/2020 |
| JP | H09-120835 | A | 5/1997 |
| JP | 2015-041418 | A | 3/2015 |
| JP | 2015-106527 | A | 6/2015 |
| JP | 2016-506021 | A | 2/2016 |
| JP | 2019-196841 | A | 11/2019 |
| JP | 2019-212468 | A | 12/2019 |
| JP | 2020-176784 | A | 10/2020 |
| JP | 2021-144879 | A | 9/2021 |
| KR | 20-2010-0011256 | U | 11/2010 |
| KR | 10-2012-0006136 | A | 1/2012 |
| KR | 10-1340365 | B1 | 12/2013 |
| KR | 10-1386673 | B1 | 4/2014 |
| KR | 10-2016-0034357 | A | 3/2016 |
| KR | 10-2016-0041407 | A | 4/2016 |
| KR | 10-1647481 | B1 | 8/2016 |
| KR | 10-2018-0080904 | A | 7/2018 |
| KR | 10-2020-0104616 | A | 9/2020 |
| KR | 2021-0020413 | A | 2/2021 |
| WO | 2020-218007 | A1 | 10/2020 |

* cited by examiner

【FIG. 1】
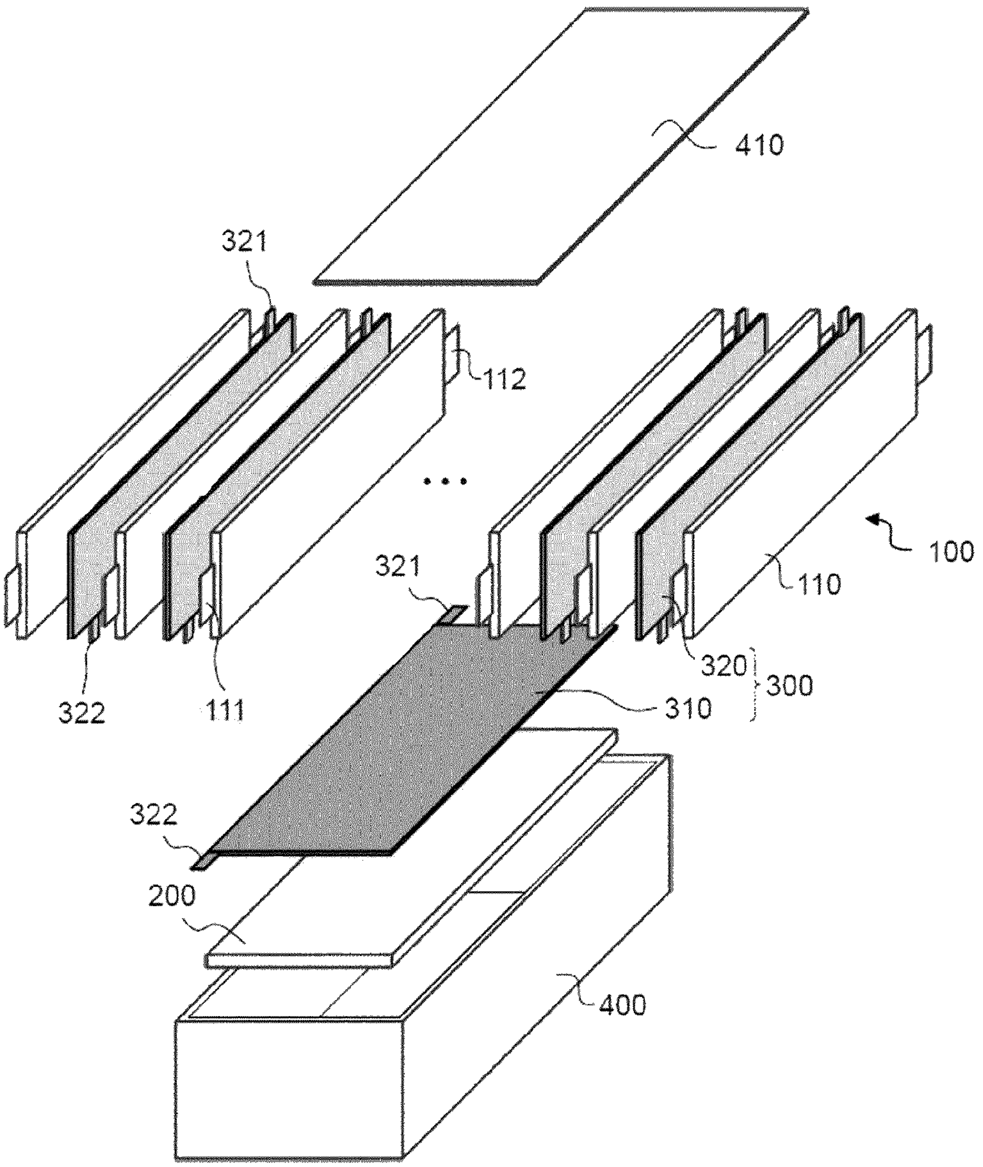

【FIG. 2】
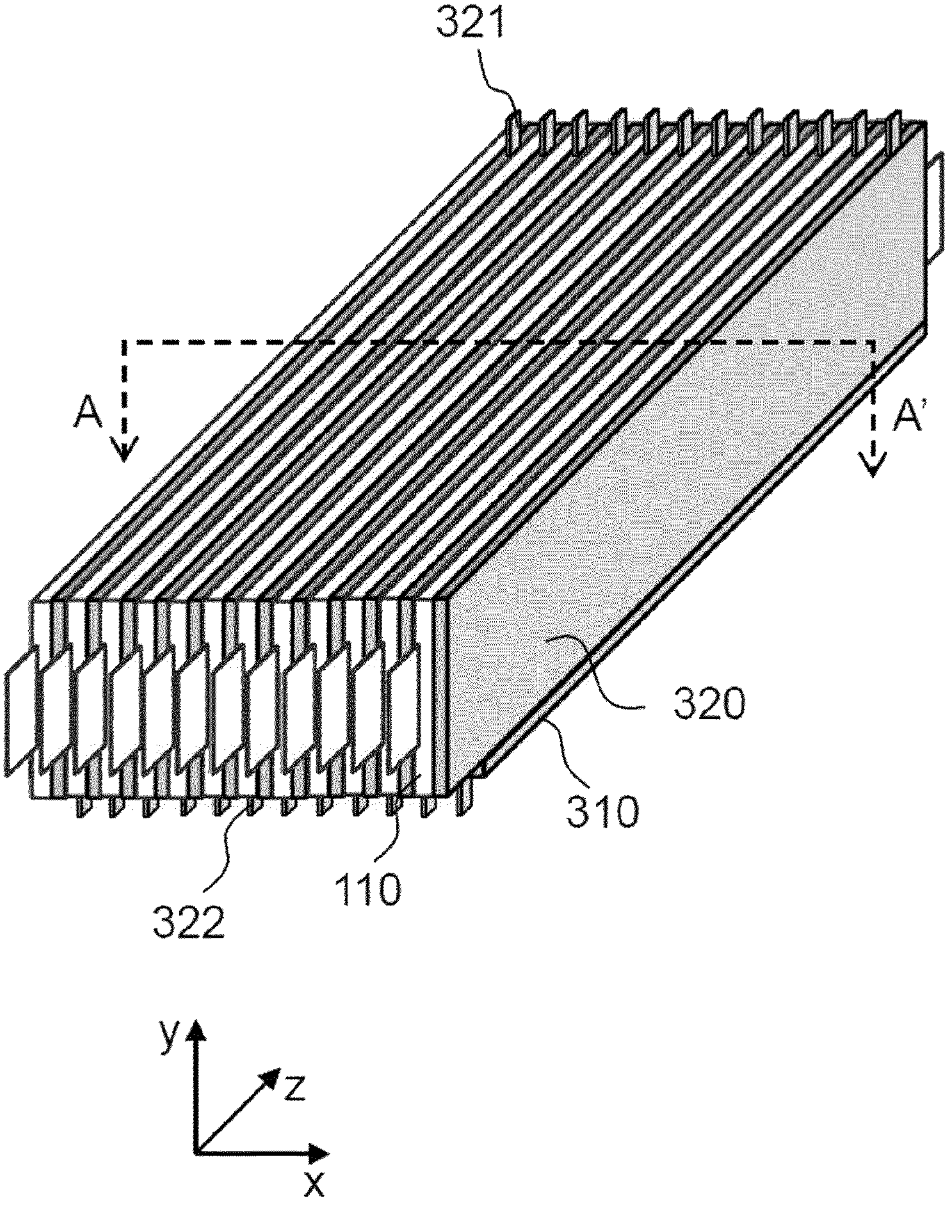

【FIG. 3】
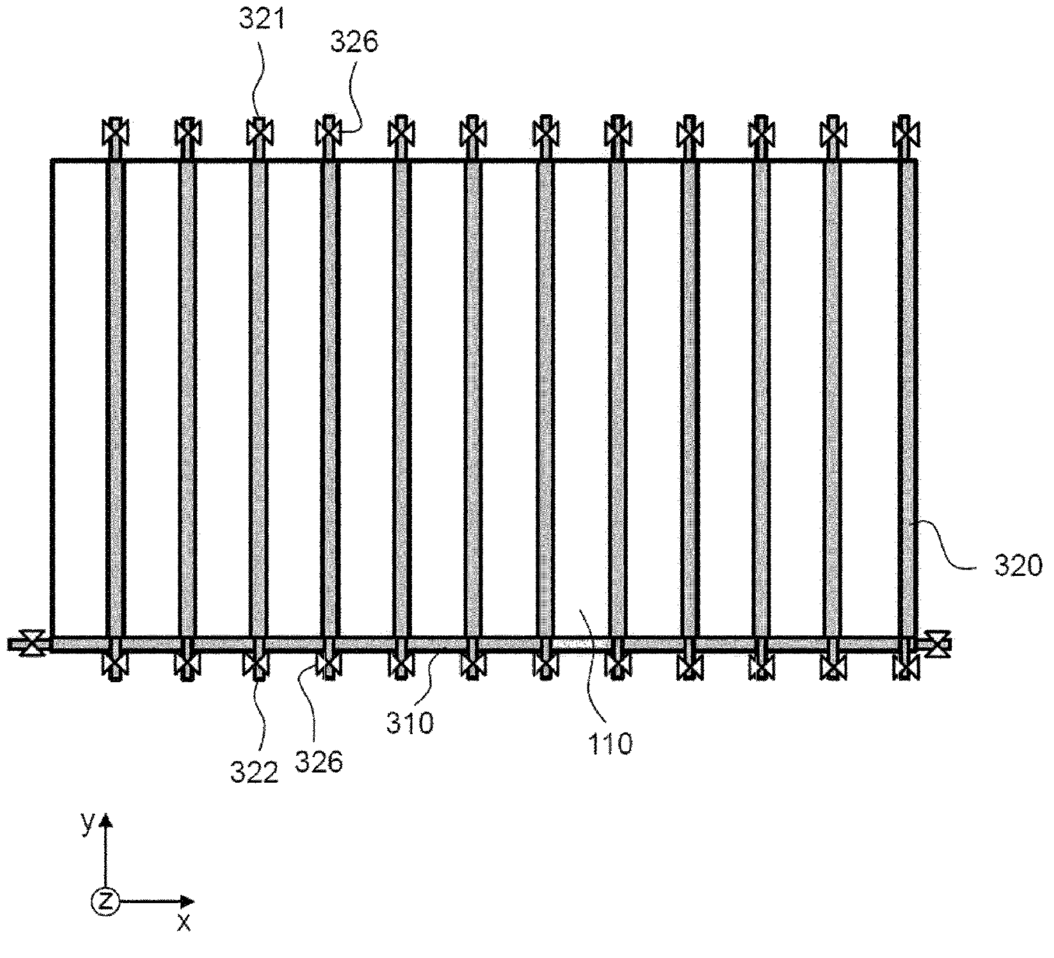

【FIG. 4】
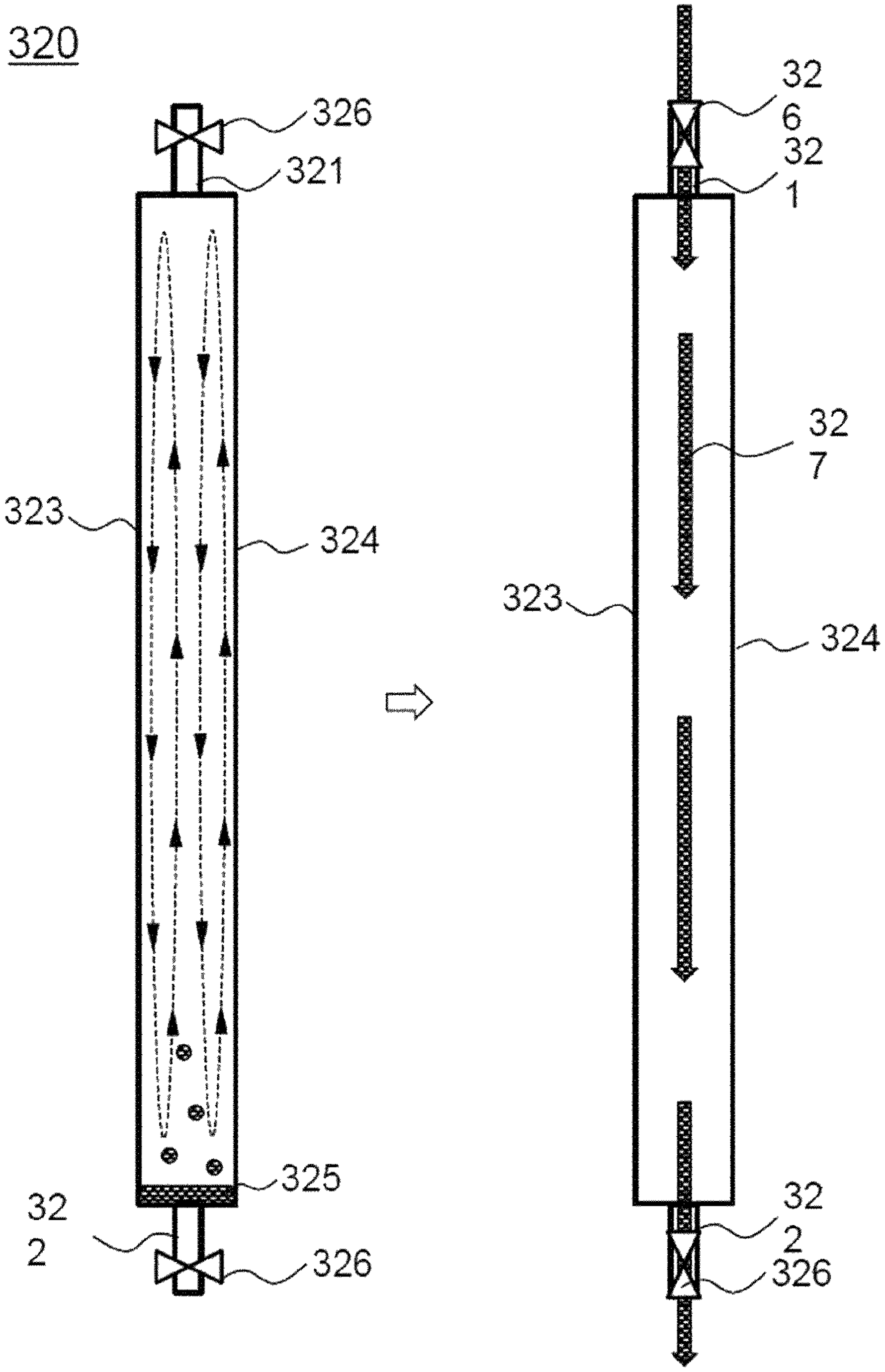

【FIG. 5】
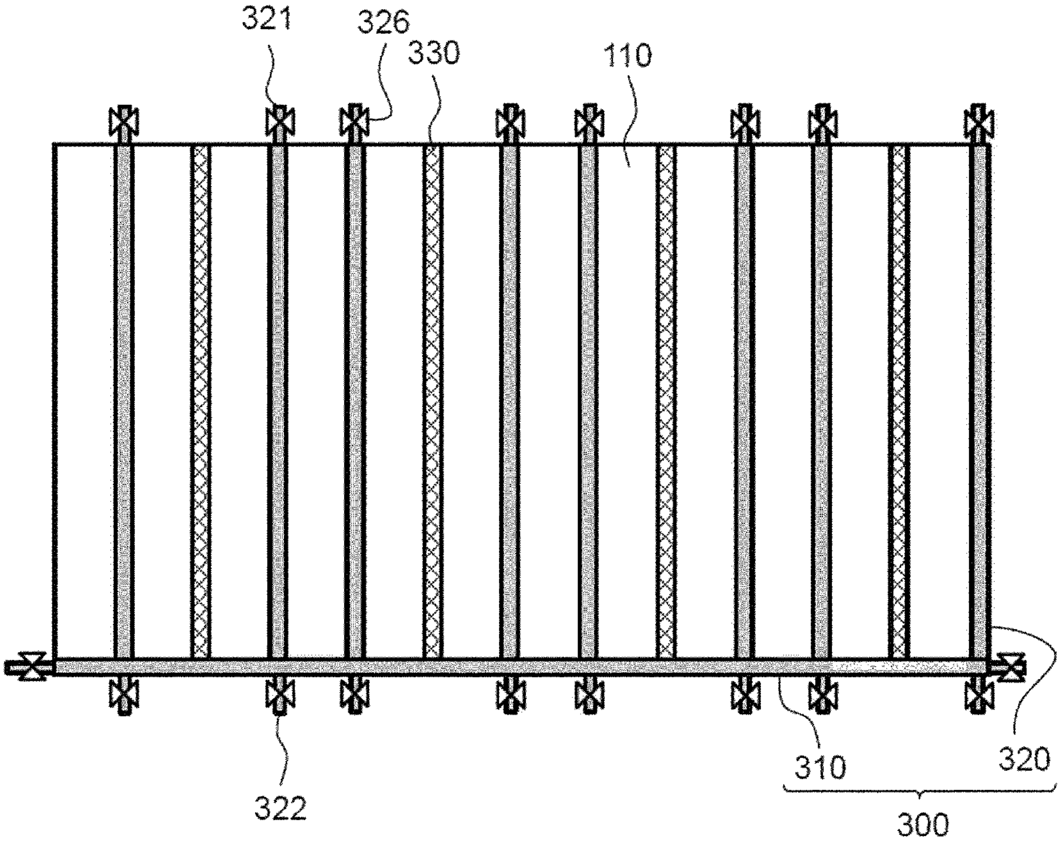

BATTERY PACK INCLUDING HEAT TRANSFER MEMBER HAVING COOLING FLUID INTRODUCTION PORTION AND COOLING FLUID DISCHARGE PORTION FORMED THEREIN

CROSS-REFERENCE TO RELATED APPLICATIONS

This application is a US national stage of international application No. PCT/KR2022/020269 filed on Dec. 13, 2022, and claims the benefit of priority to Korean Patent Application No. 2021-0183490 filed on Dec. 21, 2021, the disclosures of which are incorporated herein by reference in their entirety.

TECHNICAL FIELD

The present invention relates to a battery pack including a heat transfer member having a cooling fluid introduction portion and a cooling fluid discharge portion formed therein. More particularly, the present invention relates to a battery pack including a heat transfer member configured to allow a cooling fluid to be introduced thereinto and to be discharged therefrom to rapidly cool a high-temperature battery cell from among battery cells arranged in tight contact with each other.

BACKGROUND

A lithium secondary battery has been used as an energy source for wireless mobile devices, which are small multi-functional products, or wearable devices, which are worn on bodies, and has also been used as an energy source for electric vehicles and hybrid electric vehicles presented as alternatives to existing gasoline and diesel vehicles, which cause air pollution, or an energy storage system.

As the lithium secondary battery is used as a large-capacity, high-output energy source, as described above, it has become important to secure safety of the lithium secondary battery.

The temperature of the lithium secondary battery increases during charging and discharging thereof, and a high-temperature phenomenon of a battery cell reduces performance of the battery cell. Therefore, a heat transfer member made of a material that exhibits high thermal conductivity is provided in a battery pack such that thermal energy of the battery cell is discharged through the heat transfer member to prevent the temperature of the battery cell from increasing to a dangerous temperature or higher.

If battery cells are disposed in tight contact with each other to manufacture a battery pack having high energy density, thermal propagation to adjacent battery cells may easily occur instead of thermal energy being discharged through the heat transfer member.

Also, the speed of thermal propagation between the battery cells may rapidly increase if the heat transfer member functions as a heat transfer path between the battery cells.

Therefore, there is a need for technology capable of preventing heat transfer heat to the other battery cells when the temperature of a specific battery cell rapidly increases when a plurality of battery cells are arranged in tight contact with each other.

Patent Document 1 discloses a battery module including a battery cell, a cooling plate, and a heat absorption member, wherein a heat pipe is buried in the cooling plate. Consequently, the contact area between the heat pipe and the battery cell is large, and therefore it is possible to discharge heat from the battery cell to the cooling plate through the heat pipe.

Patent Document 2 discloses a battery pack configured such that a heat pipe is disposed between individual battery cells in a plurality of battery cells, the section of the heat pipe has an inverted T shape, and a cooling line is arranged at a lower end of the heat pipe.

In Patent Document 1 and Patent Document 2, however, it is structurally difficult to prevent thermal runaway of the battery cell when the temperature of the battery cell is equal to or higher than the vaporization temperature of a working fluid in the heat pipe.

Therefore, there is a need for technology capable of rapidly cooling a specific battery cell when a thermal runaway phenomenon occurs in the specific battery cell in a battery pack configured such that a plurality of battery cells are arranged in tight contact with each other, thereby preventing spread of thermal runaway.

REFERENCE DOCUMENTS (Patent Document 1) Korean Patent Application Publication No. 2016-0041407 (2016 Apr. 18); and (Patent Document 2) Korean Patent Application Publication No. 2020-0104616 (2020 Sep. 4).

SUMMARY

The present invention has been made in view of the above problems, and it is an objective of the present invention to provide a battery pack including a heat transfer member configured to allow a cooling fluid to be introduced thereinto and to be discharged therefrom to prevent spread of thermal runaway of a battery cell in the battery pack.

A battery pack according to the present invention to accomplish the above objective includes a battery cell stack including a plurality of battery cells, a cooling member configured to cool the battery cell stack, a heat transfer member configured to discharge heat from the plurality of battery cells to the cooling member, and a housing configured to receive the battery cell stack, the cooling member, and the heat transfer member therein, wherein the heat transfer member is provided with a cooling fluid introduction portion and a cooling fluid discharge portion.

The heat transfer member may include a refrigerant therein, and the refrigerant may undergo phase transition, in which the refrigerant is evaporated by heat from the battery cell and the refrigerant is condensed by the cooling member, and heat transfer from the plurality of battery cells to the cooling member may occur through the phase transition of the refrigerant.

The heat transfer member may include a first heat transfer member disposed between the battery cell stack and the cooling member and a second heat transfer member interposed between the plurality of battery cells.

A valve configured to control introduction and discharge of a cooling fluid may be mounted in each of the introduction portion and the discharge portion of the heat transfer member.

When the temperature of each of the battery cells increases to a dangerous temperature range, the valve may be opened such that the cooling fluid passes through the interior of the heat transfer member.

Only a valve of a heat transfer member disposed adjacent to a battery cell having temperature increasing to a predetermined level or higher may be opened.

Each of the first heat transfer member and the second heat transfer member may be formed in a flat shape.

The dangerous temperature range may be 150° C. or higher.

The battery pack may further include a temperature sensor configured to measure the temperature of each of the battery cells and a controller configured to control opening and closing of the valve based on the temperature measured by the temperature sensor.

The heat transfer member may be a heat pipe.

Each of the introduction portion and the discharge portion of the heat transfer member may be repeatedly opened and closed, and the introduction portion and the discharge portion may be closed in the state in which a small amount of refrigerant remains in the heat transfer member.

The discharge portion may be provided with a pressure reducing valve configured to reduce pressure such that a space in the heat transfer member excluding the small amount of refrigerant is in a vacuum state.

A second heat transfer member or a thermal insulation member may be disposed between the battery cells.

The thermal insulation member may be made of an elastic material.

The present invention provides a device including the battery pack as an energy source.

In addition, the present invention may provide various combinations of the above solving means.

As is apparent from the above description, a battery pack according to the present invention includes a heat transfer member configured to discharge heat from a plurality of battery cells to a cooling member, whereby it is possible to prevent a rapid increase in temperature of the battery cells.

In addition, when the temperature of the battery cell increases to a dangerous level, a cooling fluid is injected into the heat transfer member to rapidly cool the battery cell, whereby it is possible to effectively block thermal runaway.

BRIEF DESCRIPTION OF DRAWINGS

FIG. 1 is a perspective view of a battery pack according to the present invention.

FIG. 2 is a partial perspective view of a battery pack according to a first embodiment.

FIG. 3 is a sectional view along line A-A' of FIG. 2.

FIG. 4 is a vertical sectional view of an introduction portion and a discharge portion of a heat transfer member before and after opening.

FIG. 5 is a partial perspective view of a battery pack according to a second embodiment.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Embodiments of the present invention will be described in detail with reference to the accompanying drawings.

FIG. 1 is a perspective view of a battery pack according to the present invention.

Referring to FIG. 1, the battery pack according to the present invention includes a battery cell stack 100 including a plurality of battery cells 110, a cooling member 200 configured to cool the battery cell stack 100, a heat transfer member 300 configured to discharge heat from the plurality of battery cells 110 to the cooling member 200, and a housing 400 configured to receive the battery cell stack 100, the cooling member 200, and the heat transfer member 300 therein, wherein the heat transfer member 300 is provided with a cooling fluid introduction portion 321 and a cooling fluid discharge portion 322.

The heat transfer member 300 includes a first heat transfer member 310 disposed between the battery cell stack 100 and the cooling member 200 and a second heat transfer member 320 interposed between the plurality of battery cells 110.

The heat transfer member 300 includes a refrigerant therein, and a case configured to receive the refrigerant is made of a material that exhibits excellent thermal conductivity. Consequently, cooling of the battery cells and heat transfer between the battery cells are achieved through the heat transfer member 300; temperature deviation between the battery cells may be prevented through the second heat transfer member 320, and heat generated from the battery cells 110 may be discharged to the cooling member 200 through the first heat transfer member 310.

Specifically, the cooling member 200 configured to cool the battery cells 110 is disposed under the battery cell stack 100 including the plurality of battery cells 110, and the first heat transfer member 310 is disposed between the battery cell stack 100 and the cooling member 200. Consequently, heat from the battery cell stack 100 may be discharged to the cooling member 200 through the first heat transfer member 310. As a result, it is possible to maintain the temperatures of the battery cells 110 within a predetermined range.

The battery cell stack 100, the heat transfer member 300, and the cooling member 200 may be received in the housing 400, an upper open surface of the housing 400 may be covered with a top plate 410, and the housing 400 may be hermetically sealed, whereby the battery pack may be assembled.

Unlike what is shown in FIG. 1, however, the housing 400 may be formed in the shape of a mono frame configured such that end plates are assembled in directions in which electrode terminals protrude or a U-frame, and a method of hermetically sealing the battery pack may be changed depending on the shape of the housing.

The cooling member 200 may be configured such that the refrigerant flows in the case, and the cooling member 200 may be provided with an introduction portion and a discharge portion through which the refrigerant is introduced and discharged, respectively. The refrigerant may be supplied from the outside of the housing 400, and the refrigerant may be discharged to the outside of the housing 400.

The battery cell may be a pouch-shaped battery cell configured such that an electrode assembly is received in a pouch-shaped battery case made of a laminate sheet including a metal layer and a resin layer, a prismatic battery cell configured such that an electrode assembly is received in a prismatic metal can, or a cylindrical battery cell configured such that an electrode assembly is received in a cylindrical metal can.

In addition, FIG. 1 shows a bidirectional pouch-shaped battery cell configured such that a positive electrode lead 111 and a negative electrode lead 112 protrude in opposite directions. Unlike this, however, a unidirectional pouch-shaped battery cell configured such that the positive electrode lead 111 and the negative electrode lead 112 protrude in the same direction may be used.

FIG. 2 is a partial perspective view of a battery pack according to a first embodiment, and FIG. 3 is a sectional view along line A-A' of FIG. 2. A valve 326 shown in FIG. 3 is omitted from FIG. 2.

Referring to FIGS. 2 and 3, the state in which the housing and the cooling member are omitted from FIG. 1 is shown.

Each of the first heat transfer member 310 and the second heat transfer member 320 is formed in a flat shape.

The y-axis direction length and the z-axis direction length of the second heat transfer member 320 may be greater than or equal to the y-axis direction length and the z-axis direction length of each of the battery cells 110 corresponding thereto. Consequently, the contact surface between the battery cells 110 and the second heat transfer member 320 may be maximized, and therefore quick heat transfer may be achieved.

The introduction portion 321 and the discharge portion 322 of the second heat transfer member 320 are formed at an upper part and a lower part of the second heat transfer member, respectively, in the y-axis direction. The z-axis direction length of the first heat transfer member 310, on which the battery cell stack and the second heat transfer member 320 are disposed, may be equal to or less than the z-axis direction length of a structure in which the battery cells 110 and the second heat transfer member 320 are disposed in tight contact with each other. However, the x-axis direction length of the first heat transfer member 310 may be equal to the x-axis direction length of the structure in which the battery cells 110 and the second heat transfer member 320 are disposed in tight contact with each other. Consequently, the first heat transfer member 310 may be formed to have the maximum heat transfer area between the battery cells 110 and the second heat transfer member 320 and the cooling member within a possible range.

Meanwhile, the introduction portion 321 and the discharge portion 322 of the first heat transfer member 310 may protrude in a direction parallel to the x-axis direction or in a direction parallel to the z-axis direction.

In a concrete example, on the assumption that the temperature at which a thermal runaway phenomenon may occur due to heat generated from a battery cell is about 150° C., the state in which the temperature of the battery cell is lower than 150° C. is a safe temperature range, and the state in which the temperature of the battery cell is equal to or higher than 150° C. is a dangerous temperature range, the first heat transfer member 310 and the second heat transfer member 320 remain flat and the contact area with the battery cells may be maximized within the safe temperature range, whereby the battery cells may be smoothly cooled, and therefore overheating may be prevented.

FIG. 4 is a vertical sectional view of the introduction portion 321 and the discharge portion 322 of the heat transfer member before and after opening.

FIG. 4 is a vertical sectional view of the second heat transfer member 320, and the following description of the second heat transfer member will be equally applied to the first heat transfer member.

The second heat transfer member 320 may include a refrigerant 325 therein, and may be in a vacuum state in which the remaining part of the second heat transfer member excluding the refrigerant 325 is an empty space. In the vacuum-state space, phase transition of the refrigerant, in which the refrigerant 325 is evaporated by heat from the battery cell and is condensed by the cooling member 200, may occur. As a result of such phase transition of the refrigerant, heat from the plurality of battery cells 110 may be transferred to the cooling member 200 through the second heat transfer member 320 and the first heat transfer member 310.

In FIG. 4, a lower part of the second heat transfer member 320 having the refrigerant is disposed to contact the first heat transfer member 310, and the first heat transfer member 310 is disposed to contact the cooling member 200. As a result, the temperature of the first heat transfer member 310 is lower than the temperature of the second heat transfer member 320.

Consequently, a process in which the refrigerant may be condensed in a lower part of the interior of the second heat transfer member 320, the temperature of which is relatively low due to contact with the first heat transfer member 310, and the refrigerant may be evaporated in an upper part of the interior of the first heat transfer member 310, the temperature of which is relatively high.

The same phase transition in an upward-downward direction may also occur in the first heat transfer member 310 as in the second heat transfer member 320.

For example, each of the first heat transfer member 310 and the second heat transfer member 320 may be a heat pipe, and any of known heat pipes may be used as the heat transfer member according to the present invention irrespective of the kind thereof.

In a concrete example, when the temperature of the battery cell reaches 150° C. or higher, thus increasing to the dangerous temperature range, a cooling fluid may be injected into the heat transfer member to rapidly cool the battery cell to inhibit a thermal runaway phenomenon of the battery cell and to prevent transfer of flames to battery cells adjacent thereto.

Specifically, a valve 326 configured to control introduction and discharge of the cooling fluid 327 may be mounted in each of the introduction portion 321 and the discharge portion 322 of the heat transfer member. When the temperature of the battery cell increases to the dangerous temperature range, the valve 326 is opened such that the cooling fluid 327 passes through the interior of the heat transfer member 300.

When the valve 326 in the introduction portion 321 and the valve 326 in the discharge portion 322 are opened and the cooling fluid is continuously supplied so as to flow while passing through the heat transfer member, it is possible to rapidly cool the battery cell disposed in contact with the second heat transfer member 320, through which the cooling fluid flows.

The shape and position of the valve 326 are not particularly restricted. Any valve known in the art to which the present invention pertains may be used as long as it is possible to adjust introduction and discharge of the cooling fluid.

Meanwhile, the temperature of only a specific battery cell among the plurality of battery cells constituting the battery cell stack may increase to the dangerous temperature range, and the valve in each of the introduction portion 321 and the discharge portion 322 may be opened at only the second heat transfer member 320 adjacent to the specific battery cell. That is, opening and closing of the valve of each of the heat transfer members may be individually adjusted.

The first heat transfer member 310, which is disposed under the battery cell stack and the second heat transfer member 320, may include the same introduction portion and the same discharge portion as the second heat transfer member 320, wherein the introduction portion and the discharge portion may be disposed such that the cooling fluid flows in a horizontal direction in the first transfer member 310 and in a vertical direction in the second heat transfer member 320.

For example, the introduction portion may be formed at one of corner portions at which two outer peripheries of the first heat transfer member 310, which has a rectangular structure when viewed in plan, join each other, and the discharge portion may be formed at one of the other three corner portions excluding the corner portion at which the introduction portion is formed.

In the battery pack according to the present invention, as described above, the valve is opened and closed depending on the temperature of the battery cell, and the battery pack may further include a temperature sensor configured to measure the temperature of each of the battery cells and a controller configured to control opening and closing of the valve based on the temperature measured by the temperature sensor.

For example, the temperature sensor may be attached to an outer surface of the battery cell stack opposite the outer surface of the battery cell stack that faces the second heat transfer member to prevent reduction of the contact interface at which the battery cell and the heat transfer member join each other due to the presence of temperature sensor. That is, the temperature sensor may be disposed at an upper surface of the battery cell stack when a lower surface of the battery cell stack and the second heat transfer member face each other.

In the battery pack according to the present invention, whereby thermal runaway occurs when the battery cell overheats, and therefore there is a danger of fire outbreak, the heat transfer member may be opened to supply the cooling fluid, whereby it is possible to rapidly cool the overheated battery cell, and therefore it is possible to secure safety of the battery cell.

In the state in which the battery pack is normally used, the heat transfer member may include a small amount of refrigerant in a vacuum state, and the temperature of the battery cell may be maintained at a predetermined level through phase transition of the refrigerant.

When thermal runaway of the battery cell occurs, however, the cooling fluid is supplied to the heat transfer member, whereby the vacuum state of the heat transfer member is released.

In this case, the heat transfer member malfunctions, and therefore it is necessary to replace the heat transfer member.

In the present invention, the valve in each of the introduction portion and the discharge portion may be repeatedly opened and closed to reuse the heat transfer member, and when the open heat transfer member is closed, the introduction portion and the discharge portion may be closed in the state in which a small amount of cooling fluid 327 remains in the heat transfer member as the refrigerant 325. In addition, a pressure reducing valve may be provided in the discharge portion such that the space in the heat transfer member excluding the small amount of refrigerant is in a vacuum state.

The refrigerant 325 may be selected in consideration of the temperature necessary for expansion deformation. For example, the refrigerant may be selected from the group consisting of methanol, ethanol, and water.

The material for the cooling fluid 327 is not particularly restricted as long as it is possible to rapidly cool the battery cell heated to the dangerous temperature range, and the cooling fluid 327 may be made of the same material as the refrigerant 325. For example, the cooling fluid may be selected from the group consisting of methanol, ethanol, and water.

FIG. 5 is a partial perspective view of a battery pack according to a second embodiment.

Referring to FIG. 5, the state in which a housing and a cooling member are omitted from the battery pack according to the present invention is shown.

A first heat transfer member 310 is disposed under the plurality of battery cells 110, and a second heat transfer member 320 or a thermal insulation member 330 is disposed between the battery cells 110.

That is, any one of the second heat transfer member 320 and the thermal insulation member 330 is disposed between one battery cell 110 and another battery cell 110, and each of the battery cells contacts the second heat transfer member 320 on at least one outer surface thereof.

Consequently, it is possible to block heat exchange between neighboring battery cells through the thermal insulation member 330 and to discharge heat from the battery cells to the outside through the heat transfer members.

Meanwhile, each of the battery cells is a lithium secondary battery, the volume of which expands and contracts during repeated charging and discharging thereof, and therefore the volume of the battery cells may be changed during the use of the battery pack. However, it is preferable for the volume of the battery cell stack not to exceed a predetermined space provided in the battery pack, and therefore a thermal insulation member made of an elastic material may be disposed as the thermal insulation member 330 to reduce an increase in volume of the battery cell stack.

The present invention may provide a device including the battery pack according to the present invention as an energy source. For example, the device may be an electric vehicle, a hybrid electric vehicle, an ESS, an electric cart, or an electric two-wheel vehicle.

Even though the battery pack according to the present invention is applied to a device that requires high capacity and high output, as described above, it is possible to prevent a rapid increase in temperature of the battery cell and to block heat conduction between the battery cells, and therefore it is possible to provide a battery pack with improved safety.

Those skilled in the art to which the present invention pertains will appreciate that various applications and modifications are possible within the category of the present invention based on the above description.

The invention claimed is:

1. A battery pack comprising:

a battery cell stack comprising a plurality of battery cells;

a cooling member that cools the battery cell stack;

at least one heat transfer member that discharges heat from the plurality of battery cells to the cooling member; and a hermetically sealed housing that accommodates the battery cell stack, the cooling member, and the at least one heat transfer member therein, wherein the at least one heat transfer member comprises a cooling fluid introduction portion and a cooling fluid discharge portion.

2. The battery pack according to claim 1, wherein:

the at least one heat transfer member further comprises a refrigerant therein, the refrigerant undergoes a phase transition, in which the refrigerant is evaporated by heat from a battery cell from among the plurality of battery cells and the refrigerant is condensed by the cooling member, and heat transfer from the plurality of battery cells to the cooling member occurs through the phase transition of the refrigerant.

3. The battery pack according to claim 1, wherein the at least one heat transfer member comprises:

a first heat transfer member disposed between the battery cell stack and the cooling member; and at least one second heat transfer member interposed between the plurality of battery cells.

4. The battery pack according to claim 1, further comprising a valve mounted in each of the cooling fluid introduction portion and the cooling fluid discharge portion, wherein the valve controls introduction and discharge of the cooling fluid through the cooling fluid introduction portion and the cooling fluid discharge portion, respectively.

5. The battery pack according to claim 4, wherein, when temperature of each of the plurality of battery cells increases to a dangerous temperature range, the valve is opened such that the cooling fluid passes through an interior of the at least one heat transfer member.

6. The battery pack according to claim 3, comprising a plurality of second heat transfer members, wherein only a valve of one of the plurality of second heat transfer members disposed adjacent to one of the plurality of battery cells having a temperature that is at a predetermined level or higher is opened.

7. The battery pack according to claim 3, wherein each of the first heat transfer member and the second heat transfer member has a flat shape.

8. The battery pack according to claim 5, wherein the dangerous temperature range is 150° C. or higher.

9. The battery pack according to claim 4, further comprising:

a temperature sensor that measures a temperature of each of the plurality of battery cells; and a controller that controls opening and closing of the valve based on the temperature of each of the plurality of battery cells measured by the temperature sensor.

10. The battery pack according to claim 1, wherein the at least one heat transfer member is a heat pipe.

11. The battery pack according to claim 1, wherein:

each of the cooling fluid introduction portion and the cooling fluid discharge portion is repeatedly opened and closed, and the cooling fluid introduction portion and the cooling fluid discharge portion are closed in a state in which a small amount of refrigerant remains in the at least one heat transfer member.

12. The battery pack according to claim 11, wherein the cooling fluid discharge portion comprises a pressure reducing valve that reduces a pressure in the at least one heat transfer member such that a space in the at least one heat transfer member excluding refrigerant is in a vacuum state.

13. The battery pack according to claim 1, wherein a second heat transfer member or a thermal insulation member is disposed between the plurality of battery cells.

14. The battery pack according to claim 13, wherein the thermal insulation member comprises an elastic material.

15. A device comprising the battery pack according to claim 1 as an energy source.

* * * * *